Nov. 2, 1926.  
J. S. STONE  
1,605,010  
SIGNALING SYSTEM  
Filed Nov. 23, 1923    4 Sheets-Sheet 1
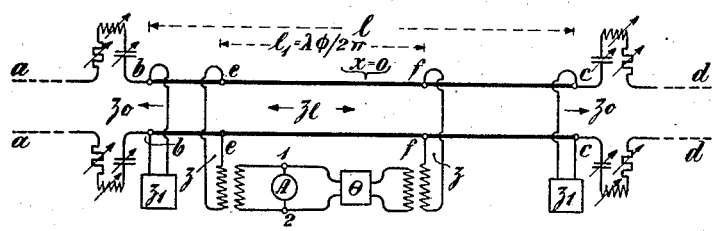
INVENTOR  
John Stone Stone  
BY  
ATTORNEY Nov. 2, 1926.

J. S. STONE 1,605,010

SIGNALING SYSTEM

Filed Nov. 23, 1923    4 Sheets-Sheet 2

INVENTOR
John Stone Stone
BY
ATTORNEY

Nov. 2, 1926.

J. S. STONE 1,605,010

SIGNALING SYSTEM

Filed Nov. 23, 1923    4 Sheets-Sheet 4

INVENTOR
John Stone Stone
BY
ATTORNEY

Patented Nov. 2, 1926.

1,605,010

UNITED STATES PATENT OFFICE.

JOHN STONE STONE, OF SAN DIEGO, CALIFORNIA, ASSIGNOR TO AMERICAN TELEPHONE AND TELEGRAPH COMPANY, A CORPORATION OF NEW YORK.

SIGNALING SYSTEM.

Application filed November 23, 1923. Serial No. 676,623.

A principal object of my invention is to provide apparatus and method for multiplex signal transmission with carrier currents on wire circuits. Another object of my invention is to effect a carrier current wire transmission through an artificial line in which the wave lengths are short distances and to secure selectivity by tapping this artificial line at points properly distanced in relation to the wave lengths. These and various other objects of my invention will be made apparent in the following specification and claims taken with the accompanying drawings, in which I have disclosed a limited number of specific embodiments of the invention by way of example. It will be understood that the invention is defined in the appended claims and that the following specification relates particularly to the examples disclosed.

Figure 16:
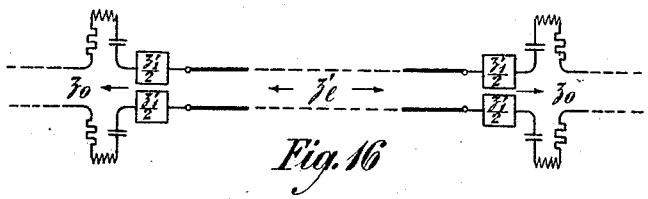
Figure 17:
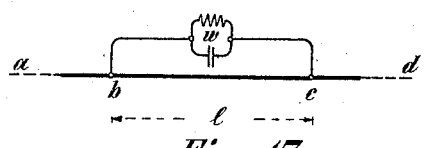
Figure 19:
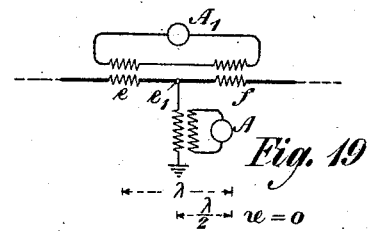
Figure 18:
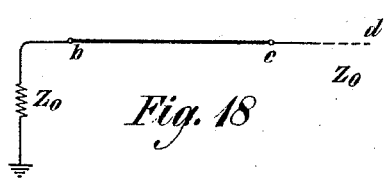
Figure 20:
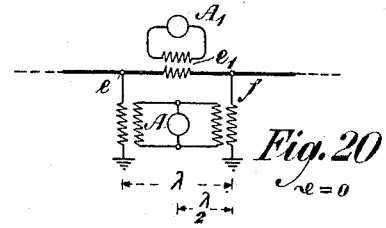
Figure 21:
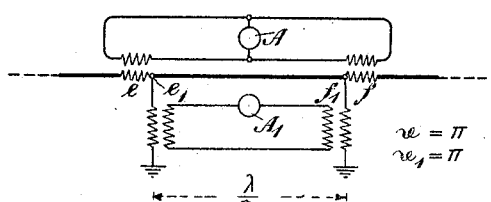
Figure 22:
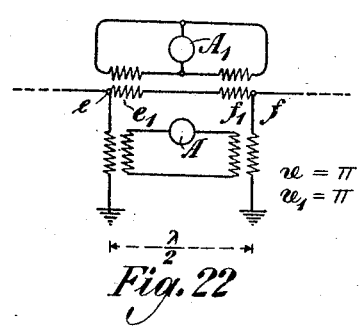
Figure 23:
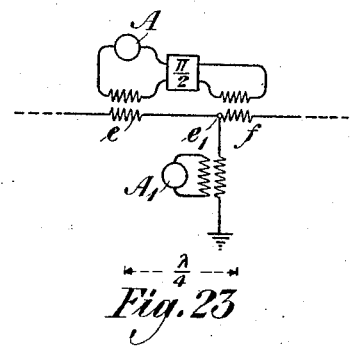
Figure 24:
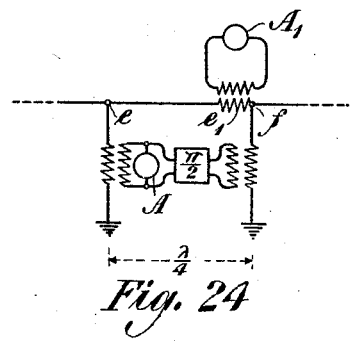
Figure 25:
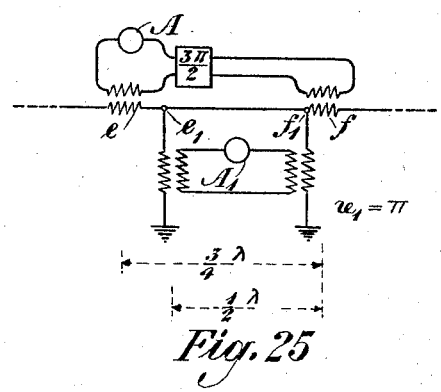
Figure 26:
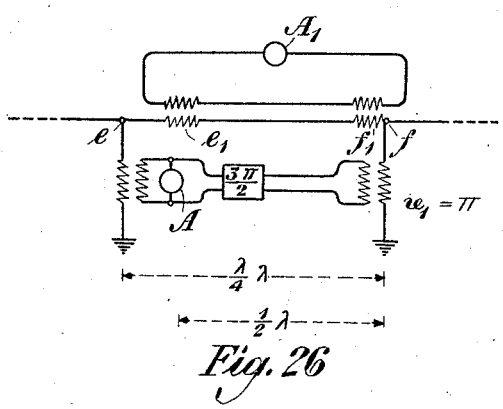
Figure 27:
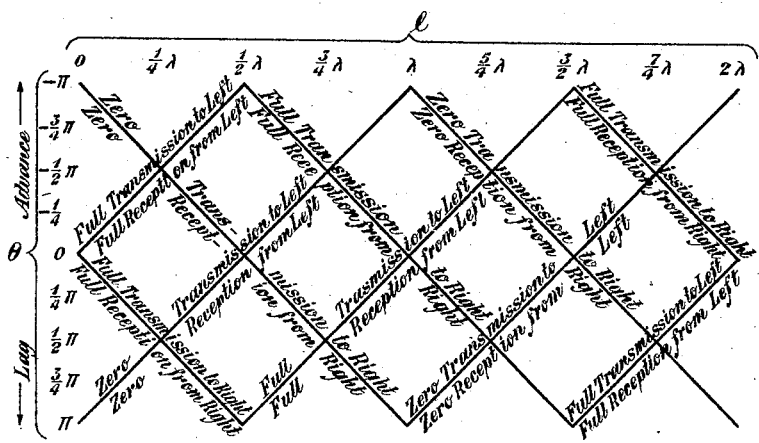
Figure 28:
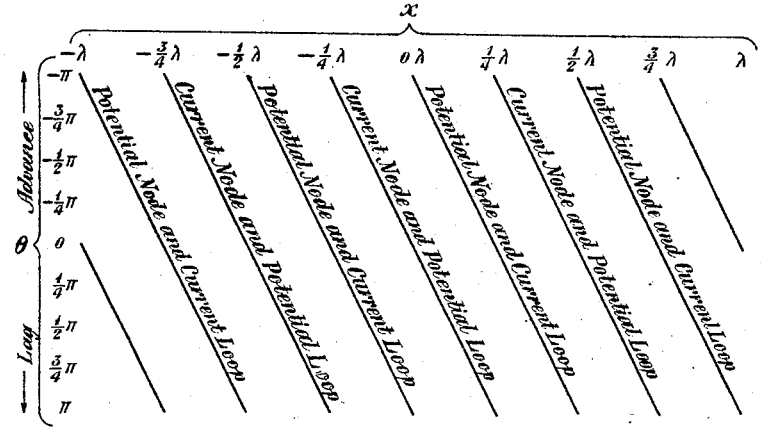
Figure 29:
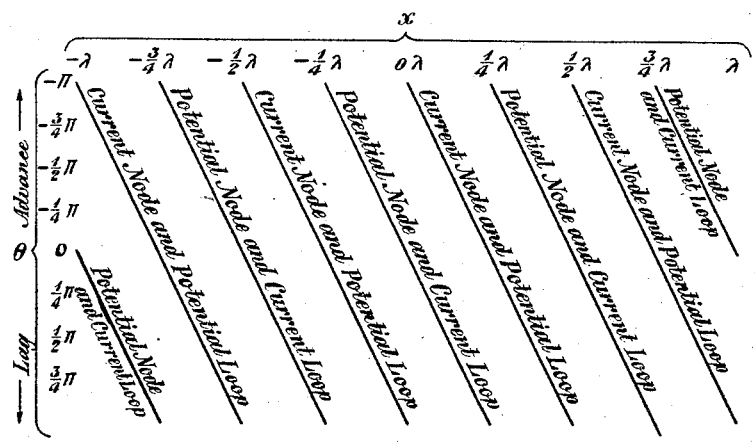

Referring to the drawings, Figure 1 is a diagram of a two-wire system embodying my invention and having shunt-connected transformers, Fig. 1$^a$ is a diagram of a system with only a single conductor and having series-connected transformers, Fig. 2 shows two transmitters or receivers or both connected to the line in conjugate relation, Figs. 3, 4 and 5 show other connections to the line for the conjugate relationship, Figs. 6, 7, 8, 9, 10 and 11 are diagrams illustrating various other embodiments of the invention, Figs. 12, 13, 14 and 15 are diagrams for modifications, Fig. 16 is a diagram of an impedance equalizing device, Fig. 17 shows a selective shunt whose purpose will be explained presently, Fig. 18 shows a terminal station on a transmission line adapted for duplex operation, Figs. 19, 20, 21 and 22 show arrangements in which two devices A and $A_1$ are both adapted for transmitting and receiving in both directions, Figs. 23 to 26 show systems in which A transmits and receives in both directions, while $A_1$ transmits and receives only on one side and Figs. 27, 28 and 29 are diagrams illustrating certain relations of phase and wave length.

Referring to Fig. 1, a long two-conductor transmission line is indicated by the reference characters $a, a, d, d$. From $b, b$ to $c, c$ a short length of artificial line is interposed. Let the impedance looking to the left at $b$, or to the right at $c$, be $z_0$. It will simplify the design if this impedance is a pure resistance and to make it such, the adjustable series resistance and reactance elements are interposed as shown in Fig. 1. Let the characteristic resistance of the artificial line $b, b, c, c$ be $z_1$. Across the points $b, b$ and likewise across the points $c, c$ connect the shunt impedance $z_1$, whose value is determined by the equation $$\frac{1}{z_1} = \frac{1}{z_0} + \frac{1}{z_1} \quad (1)$$

With this condition, the impedance looking out from the artificial line at the points $b, b$ and likewise at the points $c, c$ will be equal to $z_1$ and waves traveling along the artificial line either way will pass beyond the points $a, a$ or $b, b$ without reflection at those points.

The artificial line $b, b, c, c$ will be smooth, or of such finely divided elements, that it can be regarded as practically smooth. The general formula for the characteristic impedance of such a line is $$z_1 = \sqrt{\frac{R + ipL}{G + ipC}} \quad (2)$$

where, per unit of length, G is the shunt conductance, C is the shunt capacity, R is the series resistance, L is the series inductance, $p$ is $2\pi$ times the frequency, and $i$ is $$\sqrt{-1}.$$

In the present case, let the artificial line be so constructed that its shunt conductance and its series resistance are negligible. Accordingly, the formula becomes $$z = \sqrt{\frac{L}{C}}$$

a real number, showing that the impedance becomes a pure resistance. Since there are no elements to produce dissipation, the transmission along the artificial line will be without attenuation.

At two arbitrary points $e, e$ and $f, f$ on the artificial line, branch conductors are connected as shown in Fig. 1, and these branches are made to have equal impedance $z$, where $z$ is very great compared with $z_1$. A designates a transmitter or receiver or both, operatively connected to the branch conductors as shown in Fig. 1, with a phase retarder $\theta$ interposed on the side toward the points $f, f$.

Consider the system in relation to waves of a given length $\lambda$. Waves of this length traveling along the artificial line will experience an angular retardation between the points $e$ and $f$ as given by the formula:

$$\phi = 2\pi \frac{l_1}{\lambda} \quad (3)$$

Let the retardation of the device $\theta$ for waves of length $\lambda$ be represented by the same character $\theta$. In the following equations $q$ is an integer. Four cases may be considered.

(a) Let the interval $e, f$ be adjusted so that $$\phi = 2q\pi + \theta \quad (4)$$

In this case waves coming over the line from the right and tapped off by the branches at $e$ and $f$ will arrive at the device A in the same phase, and hence there will be full reception from the right. On the other hand, waves generated at A will be put on the lines so that those put on the line at $e$ and traveling to the right will arrive at $f$ in the same phase as those put on at $f$, and accordingly there will be full transmission to the right.

(b) Let the interval between $e, f$ be adjusted so that $$\phi = 2q\pi - \theta \quad (5)$$

In this case there will be full transmission to and reception from the left.

(c) Let the interval between $e$ and $f$ be adjusted so that $$\phi = (2q+1)\pi + \theta \quad (6)$$

Consider a train of waves coming in from the right. With this adjustment, they will arrive at the device A over the respective branches $e$ and $f$ in opposite phase, so that there will be zero reception from the right. On the other hand, for waves generated at A they will be put on the line at $e$ and $f$ so that those going to the right from $e$ will arrive at $f$ in exactly opposite phase to those put on at $f$, and there will be zero transmission to the right.

(d) Let $$\phi = (2q+1)\pi - \theta \quad (7)$$

In this case there will be zero reception from the left and zero transmission to the left.

The foregoing equations 4, 5, 6 and 7 express the relations involved in angular measure. In terms of lengths the corresponding equations are as follows:

$$l_1 = \left(q + \frac{\theta}{2\pi}\right)\lambda \quad (4')$$

$$l_1 = \left(q - \frac{\theta}{2\pi}\right)\lambda \quad (5')$$

$$l_1 = \left(2q+1 + \frac{\theta}{\pi}\right)\frac{\lambda}{2} \quad (6')$$

$$l_1 = \left(2q+1 - \frac{\theta}{\pi}\right)\frac{\lambda}{2} \quad (7')$$

The relations expressed by equations (4) to (7) and (4') to (7') are exhibited graphically in Fig. 27. When the point determined by $l$ (in terms of $\lambda$) and $\theta$ as coordinates is found to be located on one of the inclined lines of the diagram, then the condition of zero or full transmission to or reception from the right or left will be as indicated by the associated legends. Furthermore, if a point is near such a line, the corresponding condition will be approximated accordingly.

For transmission from A in Fig. 1, there will be current and potential nodes and loops between $b$ and $c$. Assume an origin at the middle point of $e, f$, where $x=0$. There are two cases to be considered. In the following equations (8) and (9), $q$ is an integer as before, but it may be negative as well as positive.

(e) Let $$x = \left(2q+1 + \frac{\theta}{\pi}\right)\frac{\lambda}{4} \quad (8)$$

There will be a potential node and a current loop at any point satisfying equation (8).

(f) Let $$x = \left(2q + \frac{\theta}{\pi}\right)\frac{\lambda}{4} \quad (9)$$

At any point $x$ satisfying equation (9), there will be a current node and a potential loop.

The relations of the foregoing equations (8) and (9) are shown graphically for Fig. 1 in Fig. 28. With $x$ (in terms of $\lambda$) and $\theta$ as coordinates, the point determined accordingly on Fig. 28 will show by its proximity to one of the inclined lines of the diagram what will be the nearest approach to the condition of node or loop at the corresponding point of the artificial line.

Instead of putting the impedance $z_1$ across the line as in Fig. 1, it may be put in series with the line, in which case the condition to be satisfied is $$z_0 + z_1 = z_1 \quad (10)$$

This will take the place of equation (1). The structural arrangement is shown in Fig. 16.

In Fig. 1 and in all the following figures, for the sake of simplicity and consistency, all the transformer coils shown are assumed to be poled in the same direction, and when the polarity or sense of winding of a coil is reversed, this will be shown in conventional manner by crossing the conductors, as for example, at the right of the retarder $\theta$ in Fig. 1$^a$.

This figure shows the transformers series connected at $e$ and $f$ instead of in shunt as in Fig. 1. Also, in Fig. 1$^a$, a grounded line is shown instead of a complete metallic circuit. Whereas in Fig. 1 the impedances $z$ were very large, in Fig. 1a they should be very small compared with $z_1$. The directional properties of Fig. 1a are the same as for Fig. 1 and the foregoing paragraphs (a), (b), (c) and (d) all apply without change. However, the conditions e and f will be reversed, so that where there is a potential node on Fig. 1, there will be a current node on Fig. 1a, etc. The relations for Fig. 1a are shown graphically in Fig. 29.

Fig. 2 shows a section of a grounded line constructed in accordance with the same principles as Fig 1. Let $x$ be a potential node between $e$ and $f$. The device $A_1$ connected at this point will be unaffected by the currents generated by the transmitter A. On the other hand, if there is a transmitter at $A_1$ its effect on a receiver at A will be null. Evidenly the two branches containing the devices A and $A_1$ are in conjugate relationship and neither will be affected by currents of the appropriate frequency that may be generated by the other.

In case the point $x$ is a current node, the branch circuit containing the device $A_1$ may be connected in series as shown in Fig. 3.

Referring to Fig. 4, suppose that both the point $e_1$ and $f_1$ are potential nodes with respect to currents from the transmitter A. A transmitting system similar to that for A may be associated with the points $e_1$ and $f_1$ and the transmitter $A_1$. The branches 1, 2 containing the device A, and 3, 4 containing the device $A_1$, are in conjugate relationship.

In Fig. 5 the principle involved is similar to that of Fig. 4 except that while A is connected through shunt branches, $A_1$ is connected in series branches, and the connection points $e_1$ and $f_1$ are current nodes instead of potential nodes as in Fig. 4.

In Figs. 4 and 5, it is comparatively unimportant so far as the conjugacy of the receiver branches is concerned, what the impedances of the branches at $e_1$ and $f_1$ may be. If we make the impedances of these branches in Fig. 4 to be very large compared to $z_1$ and those in Fig. 5 very small compared to $z_1$, we may place these branches at potential loops instead of nodes in Fig. 4 and at current loops instead of nodes in Fig. 5, and obtain conjugacy between the branches containing A and $A_1$, respectively, by means of a suitable relation between the phase retarders $\theta$ and $\theta_1$.

Referring to Fig. 6, the distance $e, f$ is $\frac{\lambda}{4}$ and the retardation given by the phase shifter is $\frac{\pi}{2}$. It may at once be determined by referring these values to Fig. 27 that the device A gives full transmission to the right and has full reception from the right, but it gives zero transmission to the left and has zero reception from the left. Accordingly, another device $A_1$ connected at the left as shown in Fig. 6 can have no current developed in it from the transmitter A, and reciprocally, A will receive no current from the transmitter at $A_1$. The branches containing the devices A and $A_1$ are in conjugate relation.

In Fig. 7 the device $A_1$ is shown series connected, instead of shunt connected as in Fig. 6, and the conjugate relationship subsists for A and $A_1$ in Fig. 7 as in Fig. 6.

As explained for Fig. 6, Fig. 8 shows the device A connected in such a way that there is full transmission to and reception from the right, but zero transmission to and reception from the left. Clearly, any number of branches such as $e_1$ and $f_1$ can be placed on the left without interfering with A or being interfered with by A, and in this way the device $A_1$ can be connected with the line through two branches as shown.

In Fig. 9 the device $A_1$ is series connected, whereas in Fig. 8 it is shunt connected.

Figure 10:
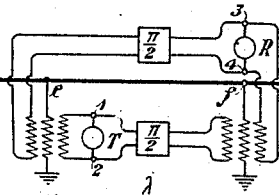

In Fig. 10, a transmitter T and a receiver R are shown in separate branches both connected alike to the line at the points $e$ and $f$. With the distance $e, f$ equal to $\frac{\lambda}{4}$ and with the phase shifters giving a retardation of $\frac{\pi}{2}$, there will be full transmission to the right from the transmitter T and full reception from the left to the receiver R. This shows how independent directional properties may be given to a transmitter and receiver connected at the same points $e$ and $f$ on the line.

Figure 11:
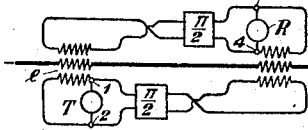
Figure 12:
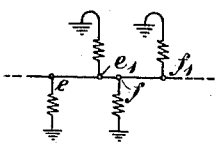
Figure 13:
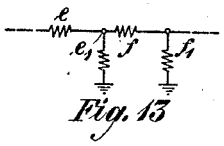
Figures 14, 15:
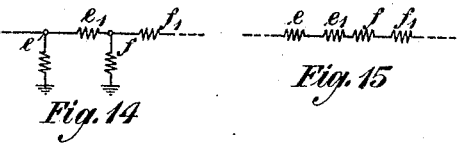

Fig. 11 shows the corresponding arrangement with series connected branches instead of shunt connected branches.

In the organizations of Figs. 4 and 5, the points of connection $e_1$ and $f_1$ both lie between the points $e$ and $f$. In Figs. 8 and 9, the points $e_1$ and $f_1$ both lie to one side of the points $e$ and $f$. In Figs. 10 and 11, the points $e_1$ and $f_1$ are respectively coincident with the points $e$ and $f$. Figs. 12, 13, 14 and 15 illustrate other special relations which may exist between the points of attachment $e, f, e_1$ and $f_1$.

It will often be desirable that waves of a different frequency from that intended for the devices $A_1$, such as in Fig. 1, shall be readily transmitted over the line from one side to the other without encountering much, if any, impedance at the artificial line itself. For this purpose a simple anti-resonant branch between the points $b$ and $c$ may be employed as in Fig. 17. The loop circuit with inductance and capacity in parallel is made of negligible resistance and with a small value for the ratio L/C. It is tuned to the particular frequency intended for the device A and accordingly functions practically as if the branch between $b$ and $c$ were open for currents of that frequency, but it affords a low impedance path for currents of substantially different frequencies.

In some cases it will be desirable to end the line at one side of the artificial line $b\ c$. In this case an impedance $z_0$ must be interposed to prevent reflections back into the line $b\ c$. The proper arrangement is shown in Fig. 18.

Some specific modifications are shown in Figs. 19 to 26 which will now be described. In view of the principles that have been explained and with the dimensions indicated by the legends on the drawings, it will be seen that in each of Figs. 19 to 22 both devices A and $A_1$ transmit and receive in both directions, but each is free from interference by the other.

In Figs. 23 to 26, inclusive, with the dimensions indicated by the associated legends, $A_1$ transmits and receives in both directions, while A transmits and receives only on the right.

Within the principles that have been explained, we have here a more flexible system than a mere pair of conjugate circuits, for we have means by which either one or both of the conjugate circuits may be given directional properties either as to transmission or reception, and these directional properties of any one of the transmitters or receivers may be made different from that of any one of the other transmitters or receivers.

When we have to deal with a band of frequencies and not with a single frequency, the circuits shown will not give strict conjugacy for all the frequencies involved but only for the medial frequency of the band, except in the special case when $q=0$. For this reason there will be a certain advantage in having compact circuits which involve values of $L$ and $L_1$ between zero and $\lambda$.

Moreover, since the rate of change of potential and current with distances near a node is very much more rapid than near a loop, the circuits which secure conjugacy by placing bridged branches at loops of potential and series branches at loops of current will be advantageous, when the width of the band is a factor, as compared with circuits which depend upon placing the bridged branches at potential nodes and the series branches at current nodes.

I claim:

1. A transmission line and branch circuits connected therewith in conjugate relationship, said line and branches comprising means to give directional properties along the line in and out of said branches.

2. A multiplex transmission system comprising a line, a station from which the line extends both ways, a length of artificial line interposed in said line at said station, and two translating devices operatively connected with said artificial line, one of said devices being connected at two places, the points of connection of said devices being placed to give directional selectivity at the particular intended operating frequency of the system.

3. A transmission system comprising a line, a station from which the line extends both ways, a length of artificial line interposed in said line at said station, and a translating device operatively connected with said artificial line at two places spaced along said artificial line to give directional selectivity at the particular intended operating frequency of the system.

4. A transmission system comprising a line and a length of artificial line serially connected therewith, an auxiliary impedance element associated with said line and artificial line at their junction point to equalize the impedance both ways, and a translating device operatively connected with said artificial line at two places spaced along said artificial line to give directional selectivity at the particular intended operating frequency of the system.

5. A multiplex transmission system comprising a line, a length of artificial line serially connected therewith, and two translating devices operatively connected with said artificial line, one of said devices being connected at two places spaced along said artificial line to give directional selectivity at the particular intended operating frequency of the system.

6. A multiplex transmission system comprising a line, a station from which the line extends both ways, a length of artificial line interposed in said line at said station, and two translating devices operatively connected with said artificial line, at least one of them being connected at two places spaced along said artificial line to give directional selectivity for the associated translating device at the particular intended operating frequency of the system.

7. A transmission system comprising a line and a length of artificial line serially connected therewith, means at the junction point to equalize the impedances of the line and artificial line, and a translating device operatively connected with said artificial line at two points spaced along said artificial line to give directional selectivity at the particular intended operating frequency of the system.

In testimony whereof I have signed my name to this specification this 14th day of November, 1923.

JOHN STONE STONE.